US008694998B2

(12) United States Patent
Gittelman et al.

(10) Patent No.: US 8,694,998 B2
(45) Date of Patent: Apr. 8, 2014

(54) CANCELLABLE COMMAND APPLICATION PROGRAMMING INTERFACE (API) FRAMEWORK

(75) Inventors: Arye Gittelman, Mercer Island, WA (US); Petru Mihai Moldovanu, Redmond, WA (US); Sterling John Crockett, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 360 days.

(21) Appl. No.: 13/220,455

(22) Filed: Aug. 29, 2011

(65) Prior Publication Data

US 2013/0055266 A1 Feb. 28, 2013

(51) Int. Cl.
*G06F 9/46* (2006.01)

(52) U.S. Cl.
USPC .......................................... 718/100

(58) Field of Classification Search
USPC .......................................... 718/100
See application file for complete search history.

(56) References Cited

U.S. PATENT DOCUMENTS

| | | | |
|---|---|---|---|
| 6,009,484 A * | 12/1999 | Miller | 710/40 |
| 6,035,324 A | 3/2000 | Chang | |
| 6,105,048 A * | 8/2000 | He | 718/100 |
| 6,336,135 B1 | 1/2002 | Niblett | |
| 6,401,099 B1 | 6/2002 | Koppolu | |
| 6,990,534 B2 | 1/2006 | Mikhailov | |
| 7,739,410 B2 | 6/2010 | Freedman | |
| 2006/0031778 A1 | 2/2006 | Goodwin | |
| 2009/0165001 A1 * | 6/2009 | Baeuerle et al. | 718/102 |
| 2010/0333091 A1 * | 12/2010 | Lin et al. | 718/100 |
| 2011/0029984 A1 * | 2/2011 | Norman et al. | 718/106 |

OTHER PUBLICATIONS

Brad McCabe, Using Threading to Build a Responsive Application with Visual Studio 2005—Published Date: Jun. 2005. http://msdn.microsoft.com/en-us/library/ms379602(VS.80).aspx.
Dino Esposito, Reporting Task Progress with ASP.NET 2.0—Retrieved Date: Jun. 16, 2011. http://msdn.microsoft.com/en-us/magazine/cc163553.aspx.

* cited by examiner

*Primary Examiner* — Emerson Puente
*Assistant Examiner* — Steven Do
(74) *Attorney, Agent, or Firm* — Tom Wong; Jim Ross; Micky Minhas (57) ABSTRACT

Embodiments are provided that include the use of a cancellable command application programming interface (API) framework that provides cooperative multitasking for synchronous and asynchronous operations based in part on a command timing sequence and a cancellable command API definition. A method of an embodiment enables a user or programmer to use a cancellable command API definition as part of implementing a responsive application interface using a command timing sequence to control execution of active tasks. A cancellable command API framework of an embodiment includes a command block including a command function, a task engine to monitor the command function, and a timer component to control execution of asynchronous and synchronous tasks based in part on first and second control timing intervals associated with a command timing sequence. Other embodiments are also disclosed.

20 Claims, 7 Drawing Sheets

CANCELLABLE COMMAND APPLICATION PROGRAMMING INTERFACE (API) FRAMEWORK

REFERENCE TO COMPUTER PROGRAM LISTING APPENDIX

Submitted concurrently herewith via the USPTO electronic filing system (EFS) is a computer program listing that includes four ASCII text files which are incorporated by reference in their entirety. The four ASCII text files include (NAME CREATION DATE SIZE (KB)): CCAPIdefexam.txt Feb. 10, 2014 2.52 KB; CCAPIutility.txt Feb. 10, 2014 21.8 KB; CCAPIuseexam.txt Feb. 10, 2014 2.46 KB; CCAPIJS.txt Feb. 10, 2014 16.4 KB.

BACKGROUND

Web browsers provide an important programming platform today, and there are a number of popular browser applications available for both handheld and desktop use. The browser framework relies on asynchronous client and server operations, along with synchronous client-side operations. As a result, purely client-side operations can operate to block a user-interface (UI) operation, which results in an apparently "hung" browser, unresponsive to the user. However, while users are comfortable with a browser's asynchronous page navigation model, the apparently non-responsive browser behaviors can detract from the user experience, resulting in users gravitating to different browser applications. Users are more likely to gravitate and use a browser application that provides a customizable, controllable, and responsive user experience.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided that include the use of a cancellable command application programming interface (API) framework that provides cooperative multitasking for synchronous and asynchronous operations based in part on a command timing sequence and a cancellable command API definition. A method of an embodiment enables a user or programmer to use a cancellable command API definition as part of implementing a responsive application interface using a command timing sequence to control execution of active tasks. A cancellable command API framework of an embodiment includes a command block including a command function and a state block, a task engine to monitor and execute the command function, and a timer component used in part to control execution of asynchronous and synchronous tasks based in part on first and second control timing intervals associated with a command timing sequence. Other embodiments are also disclosed.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

As described below, embodiments encompass cancellable command application programming interface (API) features and functionality including a cancellable command API framework that uses a cancellable command API definition. The cancellable command API definition enables programmers and other users to define a command block including state block to contain state data, and a command function, and then creating a cancellable command task that can be paused and restarted as part of a cancellable command timing interval. The command block of an embodiment includes a command function and uses the state block as a parameter.

The command function of one embodiment includes a call to a pause function in an inner loop to determine when to save state to the state block and return control, and a finish function described below. The cancellable command API framework uses a timer handler in part to control execution and processing of each task defined in part by a command timing sequence that includes a first timing interval allowing for command execution and a second timing interval allowing for updating a user interface (UI) associated with the task including responding to user input during the second timing interval. For example, a timer can be fired by a browser engine (e.g., JAVASCRIPT timer) to invoke a cancellable command API engine as part of running the task or tasks defined by the command block.

A cancellable command API framework of an embodiment can be used as part of providing a responsive UI using processor-driven code that operates in part to use control input as part of starting a cancellable command API task, the cancellable command API task defined in part by a state block and a command block used as part of executing the cancellable command API task, the command block including a command function that uses the state block as a state parameter and a call to a pause function to determine when to save state to the state block and return control, and a call to finish function to identify a task finished callback, allow a defined interval of time for the cancellable command API task to finish, and/or implement a cancellable command timer after completion of the defined interval of time.

The cancellable command timer or handler of an embodiment is used in part to control execution and processing of each cancellable command API task using a command timing sequence that includes a first timing interval to allow for command execution and a second timing interval to allow for pausing each cancellable command API task and allow UI operation/interaction during the second timing interval, and capture, use, and/or display telemetry data associated with progress of the cancellable command API task.

A cancellable command API framework of an embodiment uses a timer component including a command timing sequence divided into first and second cancellable command control time periods or intervals (e.g., one-hundred (100) millisecond (ms) sequences divided into successive fifty (50) ms intervals, or the like). In one embodiment, the first cancellable command control time interval includes an amount of processing time (e.g., 50 ms) that is allocated evenly among all of the current tasks, each task being called from first to last using a state block. In such an embodiment, a second cancellable command control time interval includes an amount of processing time (e.g., 50 ms) that is allocated to the UI. According to the command timing sequence, the first and second cancellable command control time intervals continue to be successively used until completion and/or cancellation of a cancellable command API task or tasks.

In an embodiment, the timer starts a new timing operation for each cancellable command API task after allowing a given period of time (e.g., 500 ms) to complete the work associated with each cancellable command API task. Once activated, the cancellable command API framework of an embodiment enables each command associated with a task to perform its work during a first control time interval, periodically/intermittently calling a function that informs when it is time to save an associated state in a state block and return from processing. After all commands have returned from task processing, control is returned to another component or application or thread (e.g., to an associated browser) for the duration of a second control time interval. In an embodiment, the first and second control time intervals of the cancellable command API's command timing sequence allows executable task operations to occur at half speed while allowing other operations to occur, such as updating a progress meter, updating a display or window or window portion, and/or monitor and/or respond to user control and interaction(s) as a few examples.

The cancellable command API framework operates based in part on the use of a number of callback functions, thereby operating in part to allow an operation to be overridden. For example, a user can supply a function to clean up a cancellation, provide a custom progress meter, or even cancel a cancellation as a few illustrative examples of the cancellable command API features. The cancellable command API enables commands to be specified as cancellable, wherein execution of the next cancellable command operates to implicitly cancel the first or prior cancellable command.

A cancellable command API component of an embodiment includes a control framework based in part on a command timing sequence and callback features as part of providing a responsive command interface, such as a browser interface for example. In an embodiment, the cancellable command API is configured as a cooperative multitasking system designed in part to allow synchronous and asynchronous systems to work seamlessly together. The cancellable command API component of one embodiment can be used as part of tracking operations in a web application, including providing minimal download strategy transitions that mimic normal browser navigation behavior based in part on control of synchronous and asynchronous commands. For example, functionality of the cancellable command API allows for purely client-side and client-server operations to behave like page transitions using a web browser. The cancellable command API can be used to monitor, interrupt, and/or cancel an operation or operations, without regard to the synchrony of an underlying process based in part on the command timing sequence, as described below. As an example, functionality of the cancellable command API component allows all operations in a browser web application to share a progress meter and be cancelled explicitly or implicitly using the same set of operations.

As described in detail below, the functionality of a cancellable command API component of an embodiment operates such that synchronous and asynchronous operations appear/manifest the same to a programmer and calling code. In one embodiment, a task monitor (e.g., progress meter) and cancellation code of the cancellable command API component is shared and appears the same to callers. The functionality of the cancellable command API component can provide a common way to monitor synchronous and asynchronous operations, including transforming synchronous operations into asynchronous operations as defined by a command timing sequence and thereby provide a common framework for common asynchronous operations such as progress meters, cancellation, and/or multitasking operations. In one embodiment, due in part to the cooperative nature of the cancellable command framework, command authors explicitly relinquish control to the cancellable command API component and thereby contribute to the responsive nature of the framework.

Correspondingly, the cancellable command API framework can be used in part to provide identical control behavior for synchronous and asynchronous operations. For example, the cancellable command API framework can provide functionality such that asynchronous server operations and synchronous client operations behave the same way, are cancellable in the same way, and/or an associated UI will continue to operate consistently and responsively to user input.

A cancellable command API framework of an embodiment uses a cancellable command API definition and a command timing sequence in part to provide functionality such that synchronous operations perform as asynchronous operations. For example, the cancellable command API definition uses a command function that returns control when instructed according to a pause function value passed to it and control intervals of the command timing sequence, including saving state to a designated state block as part of a control interval operation. The command function can be called again when all other operations have had a chance to run according to the command timing sequence. The functionality of the cancellable command API architecture of an embodiment provides a common cancellation framework enumerating implicit and explicit cancellations such that a stop button, page navigation or executing another cancellable command use and execute the same code in the same order so that cancellations can be handled in the same way by the various operations.

Figure 4A:
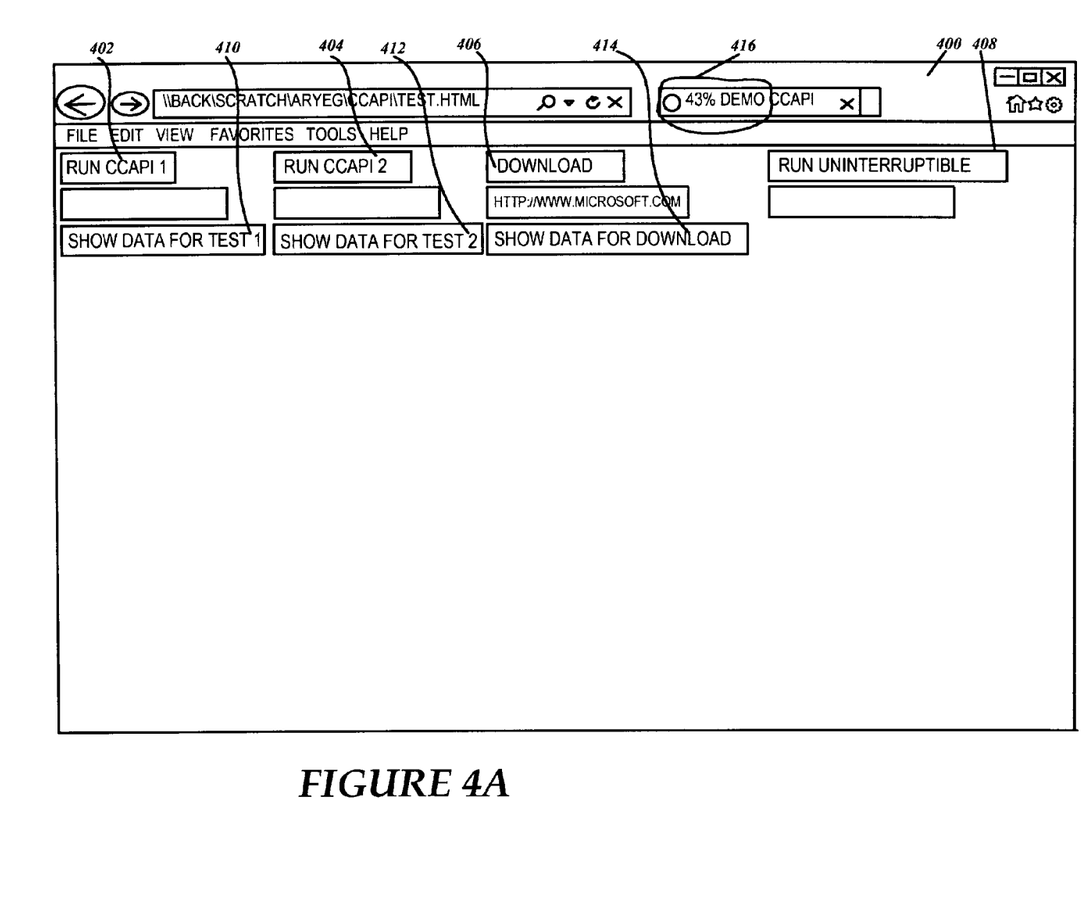
FIGS. 4A-4B are block diagrams of an exemplary browser application interface that uses features of a cancellable command API definition.
Figure 4B:
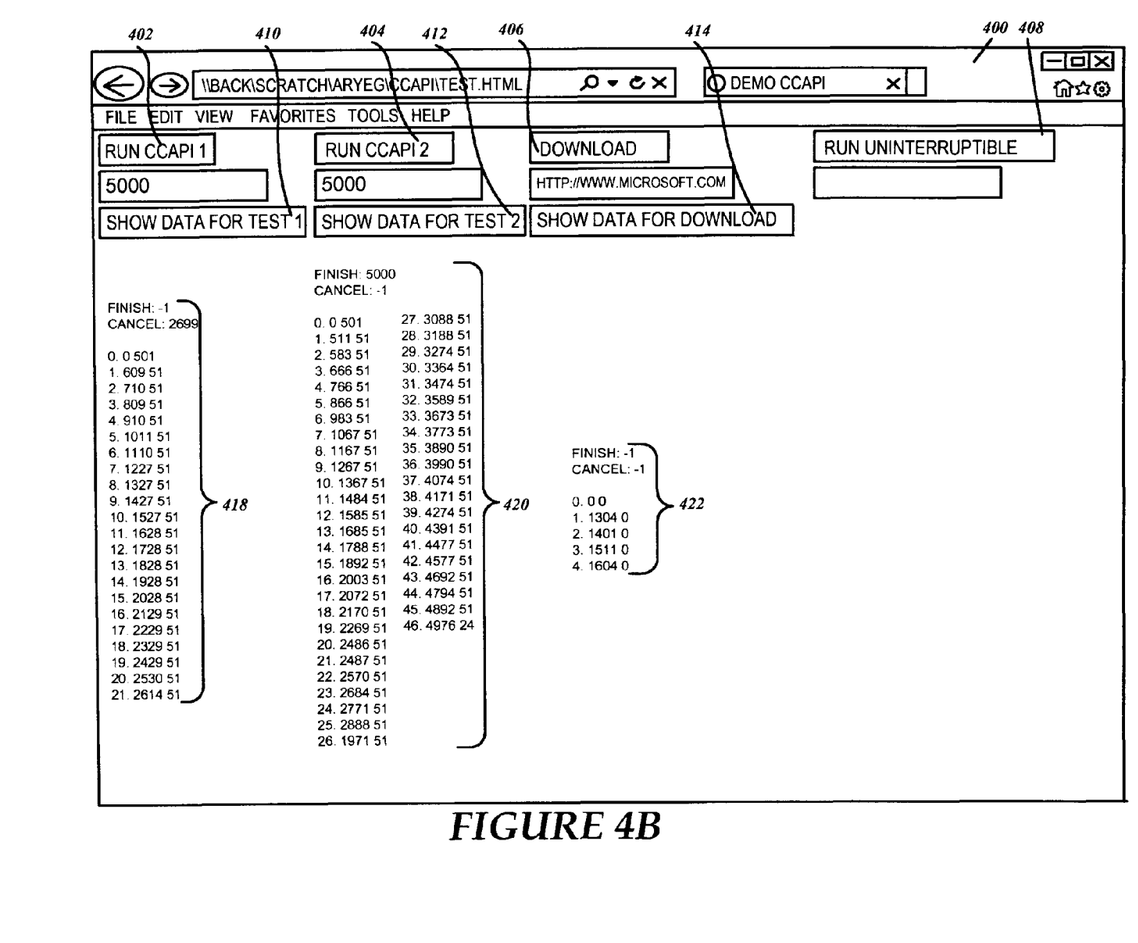

The cancellable command API component of an embodiment is configured to: provide a default and/or custom progress meter including a default and plug-in capability; mimic browser page navigation behavior such that operations that previously occurred via navigation but are now executed on an associated client still behave the same way; provide composable cancellable commands such that multiple commands can be aggregated as one task; and/or provide telemetry features including time and/or state associated with each task (see FIG. 4B for example). The cancellable command API framework can be used to provide a responsive UI including comporting with a standard for command responsiveness (e.g., turn on wait cursor at 0.5 seconds, turn on and associated progress meter at 1.0 seconds, wherein all commands are cancellable).

Figure 1:
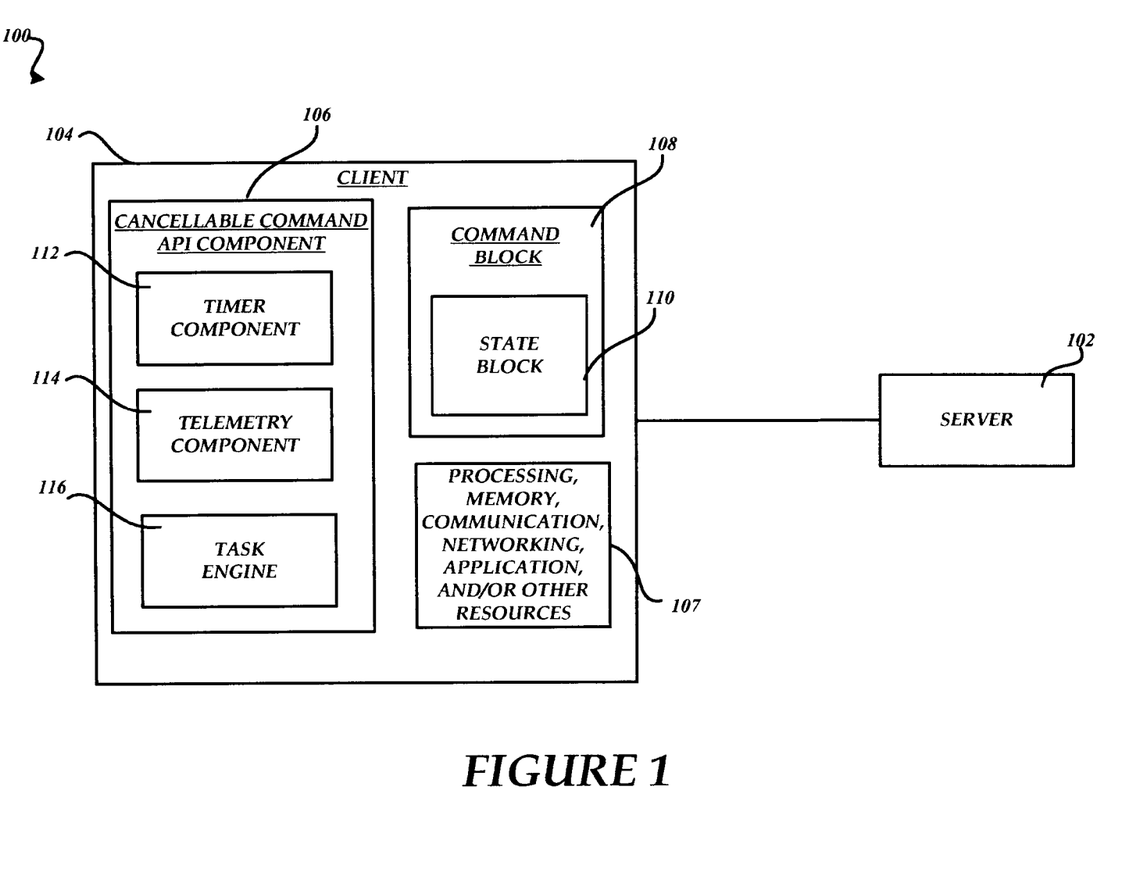
FIG. 1 is a block diagram of an exemplary computing environment.

FIG. 1 is a block diagram of an exemplary computing environment 100, but the embodiments are not so limited. While one client and server are depicted, it will be appreciated that a networked computer environment can include many types of components and the example of FIG. 1 is used in part to illustrate features of the cancellable command API framework. The exemplary environment 100 includes processing, memory, and other components that use the cancellable command API operational framework as part of providing a responsive interface to end-users, but is not so limited.

As shown in FIG. 1, the environment 100 includes a server 102 and at least one client device or system 104, such as handheld, desktop, laptop, tablet, or other type of communication/computing interface. The client 104 of an embodiment includes a cancellable command API component 106 configured in part to control synchronous and/or asynchronous operations using a command timing sequence as controlled by the timer component 112 or timer handler, described further below. The client 104 (as well as the server 102) also includes processing/memory/and other resources/applications 107. In one embodiment, features of the cancellable command API component 106 are included as part of a browser application or interface.

The client 104 of an embodiment uses a cancellable command API component 106 along with a programmer-defined command block 108 that includes a state block 110. The cancellable command API component 106 of an embodiment includes a timer component 112, a telemetry component 114, and a task engine 116, but not so limited. As described briefly above, the timer component 112 is used as part of a command timing sequence and provides time elapsed data associated with one or more cancellable command and/or other tasks. The state block 110 of one embodiment is defined using memory or other computer storage and configured to store information associated with a task execution state, such as information associated with the start of a task, intermediate task operations, and/or an end of the task as examples.

As described further below, the command block 108 is configured in part using a command function that controls execution of an associated task, but is not so limited. In one embodiment, a programmer can create a command block that includes a command function having a pause function coded in an inner loop of the command function. The pause function enables a command to pause, saving state to the state block 110 during a timing control interval of the command timing sequence. The timer component 112 of an embodiment is configured according to a command timing sequence that includes a first control interval and a second control interval. In one embodiment, the first and second control intervals can be configured to include the same amount of allocated time.

The telemetry component 114 of an embodiment is configured to capture telemetry data associated with task operations. For example, the telemetry component 114 can be configured to output time spent in a task, cancellation, completion information, and/or other state object information. The task engine 116 of an embodiment uses an associated command function as part of performing task-related operations. For example, a programmer can encode a command function that is called by the task engine 116 to perform the work or operations for an associated task or tasks.

The cancellable command API framework of an embodiment enables a programmer to control command operations to provide a responsive browser experience to the end-user. The cancellable command API framework of one embodiment includes application code that operates to control execution and processing of a command function using a command timing sequence that includes a first control timing interval that provides cooperative cancellable command task processing operations and a second control timing interval that pauses command task processing operations and allows other processing operations. The cooperative framework enables command authors to explicitly relinquish control to the cancellable command API component as part of controlling and managing synchronous and/or asynchronous commands.

In accordance with an embodiment, the cancellable command API component 106 uses an API definition used in part to provide command control and execution features and functionality. The cancellable command API component 106 of an embodiment can be used in conjunction with a browser application to provide a control interface as part of maintaining and/or promoting browser responsiveness. Using the API definition, the cancellable command API component 106 can be configured to remain agnostic to whether a command is happening asynchronously on the server or synchronously on the client and makes both operations appear the same to the programmer and the user. As an example, the API definition can be defined as follows:

SP.Utilities.Task(element, timeout, commandBlock, cancelFunction, longFunction, progressFunction)

In an embodiment, a cancellable command API component can be configured leanly to use the element object, timeout parameter, and the commandBlock or command block feature. The cancelFunction or cancel function feature, longFunction or long function feature, and/or progressFunction or progress function feature can be used as optional programming and/or cancellable control features in addition to the command block features. When using the exemplary cancellable command API definition as part of creating/maintaining a responsive UI, the programmer or user can create a new cancellable task for an associated command.

According to the API definition of an embodiment, the element object comprises an operation element (e.g., a DOM element). For example, the element object can be configured as an interactive interface element being or to be modified, such as a clickable button or other interface used to start a task upon activating the associated interactive interface. In one embodiment, when a task becomes long running, a mouse cursor or other input identifier can be displayed as a wait interface (e.g., wait button) to highlight the long running condition. A long running function can be used to identify a long running task. The timeout parameter can be used as an optional timeout for an associated command. For example, if the timeout value specified is zero (0) (or less), then there is no timeout and the operation will run until completion, unless explicitly or implicitly cancelled. If the timeout value is greater than zero, the operation will be automatically cancelled, including a call to the cancel function, when the time reaches the timeout value in milliseconds (ms) for example.

The command block feature of an embodiment is configured as a programmable structure (e.g., JAVASCRIPT class) that describes the command part of an operation (e.g., SP.Utilities.CommandBlock).

A command block feature of an embodiment can be configured using the following three features, but is not so limited:

1) state: refers to any object containing whatever information an operation needs to perform one or more associated tasks. For example, the state can be configured as a JAVASCRIPT class function and passed to other functions by the task engine 116. A command writer/creator completely owns the state object, which can be treated as a black box by the cancellable command API and passed to the commandFunction( ). Typically, a state object represents a task state at the beginning of an operation when initialized, and can also store the incremental state in some fashion for each step/operation;

2) percentDone=commandFunction(state, pauseFunction) or command function: refers to an actual command function called by the task engine 116 until the operation is completed or cancelled and returns a percentage value of the associated task that the task engine 116 has completed. The command function uses the state object included in the command block to create the task object. The programmer can use the state object to store an associated state when relinquishing control to a UI or other component. The pauseFunction( ) or pause function of an embodiment is supplied as part of the cancellable command API framework.

The pause function can be configured to return a value of false until an associated cancellable command is deemed to be long running such that the cancellable command will incur very little performance penalty as it occurs effectively instantaneous. As described above, the timer component 112 of an embodiment operates to start a task timer once an associated command is deemed to be long running. Thus, after an initial grace period (e.g., 500 ms), the operation will get only half the CPU or other processing time for execution unless the operation is inherently asynchronous (e.g., such as a download) due in part to the command timing sequence. In one embodiment, as part of achieving a desired responsiveness and control, a programmer or other user can write code that calls the pauseFunction( ) in an associated inner loop of the command function. When the pauseFunction( ) returns true, the process associated with the command function saves state and exits, relinquishing control to the cancellable command API component 106. The command function can be called again and should not be NULL; and/or, 3) finishFunction(element, state) or finish function: can be called when the percentDone returned by the function( ) parameter is >1 and may be null (e.g., optional).

The cancellable command API component 106 can also be configured with a cancellation feature corresponding to a cancelFunction(element, state, type) or cancel function that will be called when a user or other component/application cancels the operation. The cancel function can be null if there is no work to do. As an example, a programmer can shut down a task operation in an orderly fashion upon cancellation (or set it up to shut down in the case of asynchronous task operations). The cancellable command API component 106 can be configured to resume a command if a program prompts the user to cancel and the user selects/answers "no" or refuses a cancellation. If the command returns "true," then the cancellation succeeded and the process can continue. If the command returns "false," then the cancellation failed for some reason, such as when a user was prompted to cancel and deferred. If the cancellation was implicit, a new command is not started and a currently operating command continues to completion or timeout. In an embodiment, the cancellable command API component 106 uses the type parameter to indicate how a cancellation occurred, such as by an explicit cancellation, implicit by command, and/or implicit by navigation away from a page as examples.

The longFunction(element, state) or long function will be called when an operation or process crosses a defined long running operation time (e.g., greater than 500 ms) and may be null. The wait cursor can be set at this time whether there is a function or not. In one embodiment, the wait cursor is positioned over an associated command element when operating (e.g., spinning).

The progressFunction(percentDone, timeElapsed) or progress function of an embodiment can be called to display and/or update a progress meter or other component/feature. The progress function may be null, in which case a default progress meter can be used. A default progress meter can be provided and used as a general rule. In one embodiment, if a percentDone value is greater than or equal to zero, the progress meter is configured to display the percent done value, rounded to the nearest percent, or if the percentDone value is less than zero, the progress meter can be configured to display a time elapsed value (e.g., time elapsed value in (ms)) rounded to the nearest second. In one embodiment, the progress meter or progress function can be called in each second control or timing interval (e.g., every 0.05 sec) after one second has elapsed since starting a task.

The task start function=Task.start ( ) and is available on the task object and used to begin executing an associated task.

The task cancel function=Task.cancel(SPUtilities.CCHelpers.CancelType type) is available on the task object and used to stop/cancel an associated cancellable command task. The task cancel function is used internally when the user starts another task or cancels a current task and is available to outside code. The task cancel function should not be called from within any of the callback functions specified for the cancellable command task object.

Exemplary cancellation types include (e.g., using JAVASCRIPT): explicit cancellation (such as by affirmative user input (e.g., a "cancel" button click); implicit by command (e.g., cancelled by another cancellable command block); and/or, implicit by navigation (e.g., browsing to a different web page). The task cancel function returns true if the operation was actually cancelled, essentially passing along the return value to the cancel function as described above. While embodiments describe using the cancellable command API framework in the context of cancelling commands, those skilled in the art will appreciate that the description encompasses a more general cooperative multitasking system. Thus, if a user clicks on another cancellable command while a previously started cancellable command is still running, the cancellable command API framework is configured in part to cancel the current cancellable command.

The following example illustrates use the cancellable command API definition as part of creating cancellable command tasks for an associated browser interface or experience. For example, a programmer can write code to create a state object and a task, including the command action associated with starting the task by supplying a command function to execute the cancellable command.

For this example, consider the ASCII text file entitled "CCAPIdefexam.txt" filed via the USPTO EFS as referenced in "Reference to Computer Program Listing Appendix."

In an embodiment, cancellable command API features and functionality can be implemented based in part on a source code file, an example of which is provided below. For example, a source code file can be created using development software for developing software components that are implemented in distributed and other computing environments.

As an example, source code associated with a CCAPI component 106 of an embodiment can be configured as the ASCII text file entitled "CCAPIutility.txt" filed via the USPTO EFS as referenced in "Reference to Computer Program Listing Appendix."

The following example illustrates some of the uses of the cancellable command API framework features and functionality. In general, a state object and a task are created for starting and/or executing as part of implementing a command function. A programmer or other user can create and/or supply a command function to execute a command associated with a task or tasks. As discussed above, a number of callbacks can be optionally used to provide further cancellable command features and functionality.

For this illustrative example consider the ASCII text file entitled "CCAPIuseexam.txt" filed via the USPTO EFS as referenced in "Reference to Computer Program Listing Appendix."

The functionality described herein can be used by or part of browser system, an operating system (OS), file system, web-based system, hosted, or other computing system or device, but is not so limited. In one embodiment, the environment 100 can be communicatively coupled to a file system, virtual web, network, and/or other information sources. An exemplary computing system or device includes suitable programming means for operating in accordance with a method of using cancellable command API features and functionality.

Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described herein, it will be appreciated that other numbers and/or types and/or configurations can be included according to various embodiments. Accordingly, component functionality can be further divided and/or combined with other component functionalities according to desired implementations.

Figure 2:
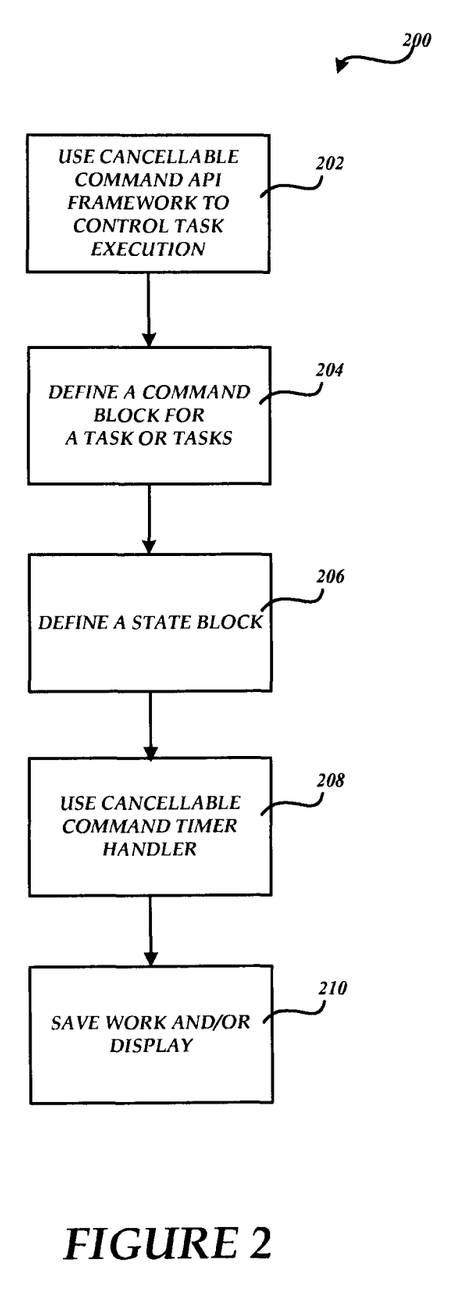
FIG. 2 is a flow diagram illustrating an exemplary process of using a cancellable command application programming interface (API) framework.

FIG. 2 is a flow diagram illustrating an exemplary process 200 of using features of a cancellable command API framework, but is not so limited. For example, the process 200 can use a cancellable command API definition as part of encoding an interactive browser interface to include control features that, when selected (e.g., button click), perform processing operations as part of executing and/or cancelling a task or tasks (e.g., computing a factorial, predicting an end-state, etc.).

At 202, the process 200 operates to use the cancellable command API framework in part to control execution of a task. For example, a user can use a programming application and features of the cancellable command API framework to control execution steps associated with a cancellable command task. At 204, the process 200 defines a command block associated with a task or tasks including a command function.

At 206, the process 200 defines a state block contained by the command block. For example, a user can create a state block to capture an object's state at different points in a task execution process and output state data that is used in part to pause and restart task operations. In an embodiment, the process 200 at 206 operates to define a command block including a command function that uses the state block as a parameter and a call to a pause function in an inner loop of the command function to determine when to save state and return control, and a finish function that uses an element parameter and the state block.

At 208, the process uses a cancellable command timer handler in part to control execution and processing of each task. In an embodiment, the process 200 at 208 operates in part according to a command timing sequence that includes a first timing or control interval allowing for command execution and a second timing or control interval allowing for updating a user interface (UI) associated with the task including responding to user input during the second timing interval. At 210, the process 200 operates to save and/or display aspects of a cancellable command feature or command features, such as telemetry data associated with the processing of a cancellable task for example.

It will be appreciated that processing and/or networking features can assist in providing responsive interactive features. Aspects of the process 200 can be distributed to and among other components of a computing architecture, and client, server, and other examples and embodiments are not intended to limit features described herein. While a certain number and order of operations is described for the exemplary flow of FIG. 2, it will be appreciated that other numbers and/or orders of operations can be used according to desired implementations.

Figure 3:
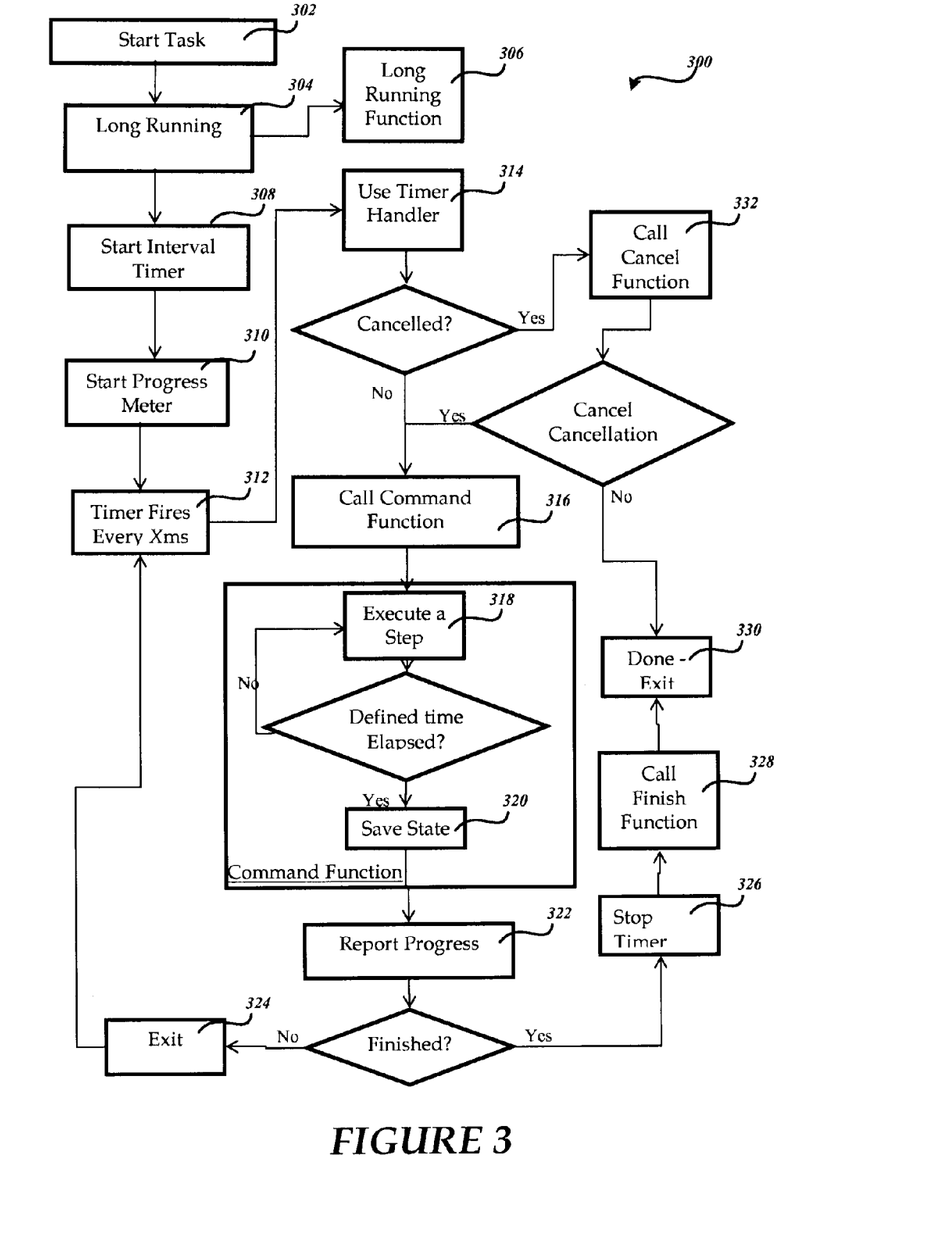
FIG. 3 is a flow diagram illustrating an exemplary process of using a cancellable command API framework as part of providing a responsive application experience.

FIG. 3 is a flow diagram illustrating an exemplary process 300 of using a cancellable command API framework as part of providing a responsive application experience, but is not so limited. For example, the process 300 can be used to control execution of cancellable command task operations to provide a responsive browsing experience, including controlling execution of multiple asynchronous and/or synchronous tasks according to a command timing sequence. For example, a first interval of a command timing sequence can be used to allocate available processing resources as part of performing task operations, such as equally or in some portion apportioning the available processing resources during the first interval.

As shown in FIG. 3, at 302, the process 300 uses a control input to start a cancellable command API task. For example, an integrated browser command interface can be used to start or restart a cancellable task. The cancellable command API task defined in part by a command block, state block, and a command function used as part of executing the cancellable command API task. Tasks and associated command block can be compiled and managed using a list data structure. At 304, if the process 300 determines that the cancellable command API task is long running, the flow proceeds to 306 and a long running function is called. For example, as part of providing responsive browser functionality, a long running task timer can be used to allow for an amount of time (e.g., 0.5 sec) for a task to complete before starting control task execution control operations using a command timing sequence, allowing for shared processing time by a plurality of executing tasks. In one embodiment, the long running time can be included as part of the command timing sequence.

At 308, the process 300 starts an interval timer associated with the command timing sequence. At 310, the process 300 of an embodiment starts a progress meter and continues to 312 where a timer activates according to an interval of the command timing sequence. For example, the timer can be programmed to fire every 100 ms, where the first 50 ms or so is attributed to task execution operations and the second 50 ms or so is attributed to other operations while pausing cancellable task execution operations. At 314, the process 300 uses a timer handler to manage the command timing sequence. For example, the timer handler can operate when firing a timer to call a command function, such that the command function is called every time the timer fires until task completion or cancellation.

At 316, if the task has not been cancelled, the process 300 operates to call the command function associated with the cancellable command API task. At 318, as part of a first timing control interval of a command timing sequence, the process 300 operates to execute a step or operation associated with the cancellable command API task. For example, the command function may be used as part of a factorial calculation and a step involves a multiplication operation or operations. If a defined amount of time associated with the first timing control interval has not elapsed, the process 300 returns to 318 and executes another step. For example, the first timing control interval can be defined (e.g., 50 ms) to allow task operations during the defined timer interval, and a call to a pause function can be used in part to quantify an elapsed amount of time (e.g., time difference between call to command function and call to pause function).

If a defined amount of time associated with the first timing control interval has elapsed, the process 300 proceeds to 320 and saves state. For example, the process 300 at 320 can save the current state to a state block associated with the command function to use as a starting point for subsequent task processing operations. At 322, the process 300 operates to report progress associated with the execution of the cancellable command API task. If the command function is not finished, the process 300 proceeds to 324 and task execution operations pause while waiting for the timer to fire according to the next command timing sequence at 312.

If the command function is finished, the process 300 proceeds to 326 and operates to stop the timer. At 328, the process 300 operates to call a finish function, proceeds to 330, and exits. However, as shown in the example of FIG. 3, if the cancellable command API task is cancelled, the process 300 proceeds to 332 and calls a cancel function. If the cancel operation is cancelled, the process 300 returns to 316. If the cancel operation is not cancelled, the process 300 proceeds to 330 and exits. In an embodiment, the process 300 uses the long function, cancel function and/or finish function optionally as callback features.

Additional features can be implemented with the process 300 such as providing telemetry information, and default or custom visual progress and/or completion objects, and/or cancellation features. As an example, the process 300 can be configured to output telemetry data, provide/use a progress meter, output a time elapsed since execution, and/or use configurable control timing intervals or periods. Processing and/or networking features can assist in providing real-time interactive features. While the cancellable command API can be included as part of a browser application, aspects of the process 300 can be distributed to and among other components of a computing architecture, and other examples and embodiments are not intended to limit features described herein. While a certain number and order of operations is described for the exemplary flow of FIG. 3, it will be appreciated that other numbers and/or orders can be used according to desired implementations.

FIGS. 4A-4B are block diagrams of an exemplary browser application interface 400 that uses a cancellable command API framework as part of providing a configurable and responsive UI, but is not so limited. FIG. 4A depicts the exemplary browser application interface 400 at a first point in time and FIG. 4B depicts the exemplary browser application interface 400 at a later point in time, as described below. The cancellable command API framework of an embodiment includes a command function and a number of callback features used in part to provide a responsive browser interface. For example, a programmer can use hypertext markup language (HTML) and JAVASCRIPT coding procedures to design and provide a browser interface or aspects thereof that includes a number of interactive command buttons or other interactive and/or cancellable features under control of the cancellable command API framework.

A programmer can use features and functionality of the cancellable command API framework to control and manage certain interactive elements (e.g., command buttons) that are provisioned and coded as cancellable, but is not so limited. A programmer can also use the cancellable command API framework to modify currently existing browser interface features to be cancellable. As shown in FIG. 4A, the exemplary browser interface 400 includes command buttons 402, 404, 406, and 408. As described further below, command buttons 402 and 404 have been configured to use the cancellation, processor-sharing, and other features of cancellable command API framework.

Command buttons 402, 404, and 406 have associated show data buttons 410, 412, and 414. For this example, the run uninterruptible button 408 does not use the features and functionality of the cancellable command API framework and is programmed as a synchronous JAVASCRIPT command. For this example, command button 402 ("Run CCAPI 1) and command button 404 ("Run CCAPI 2") have been programmed as synchronous JAVASCRIPT commands entirely as part of an associated browser client. As described in detail above, the client-side synchronous tasks can be made asynchronous using the cancellable command API framework. The download button 406 can be used to perform an asynchronous download using an associated server or servers.

As shown for the example in FIG. 4A, the exemplary browser application interface 400 is depicted at point in time after a user has selected (e.g., clicked) the command button 402. As reflected in the browser tab of FIG. 4A, the cancellable command API framework has operated to provide a percent done value 416 that has been programmed to be displayed in the title portion of the tab (depicted as "43%"). The percent done value 416 changes as the task progresses, and is updated according to the second control timing interval of the command timing sequence. The percent done value 416 changes and is updated as the task executes.

As illustrative use examples, a user can select the run uninterruptible button 408 which operates to freeze the UI, preventing other buttons from being used while running the associated uninterruptible task to completion. Alternatively, the user can click on the command button 402 which causes the cancellable command API framework in part to provide the task progress, as described above. The mouse cursor will change to a "wait" cursor after half a second, but only over the button for this example. At some point after initially selecting the command button 402, a user can select the show data for test 1 button 410 to display telemetry data associated with execution of the associated task (see FIG. 4B), including time slices allotted to the task using the cancellable command API framework. The user can click on button 410 again to see how the data changes as the task progresses.

As shown in FIG. 4B, the exemplary browser application interface 400 is shown at a point in time after a user has selected the command button 402, waited about two and one-half seconds, and then selected the command button 404 (which has cancelled cancellable Test 1 task due in part to a command function for the cancellable Test 2 task), waited for Task 2 to finish, and then selected the download button 406. At the time of the capture, the telemetry component has provided the Test 1 telemetry information 418, Test 2 telemetry information 420, and download information 422 which is displayed using the buttons 410-414.

At this point in time for this example, output Test 1 telemetry information 418 shows that the task associated with command button 402 was cancelled at 2699 ms (implicitly cancelled by start of Task 2 due to coded cancellable command function for Task 2) and did not finish (value equals −1). The output Test 1 telemetry information 418 also shows that there were twenty-one (21) control time slices (1.-21.) associated with the command timing sequence for the Test 1 task. As shown, and according to the command timing sequence, 51 ms was allotted to the associated command as part of a first control timing interval. The first time slice (0.) lasted 501 ms according to a long running time to allow a designated amount of time for the associated task to finish before using the command timing sequence. The subsequent command timing sequences can be dictated by the implemented timing component, such as a JAVASCRIPT timer for example. As described above, the command pauses at the end of the first control timing interval and waits during a second control timing interval, which allows the progress shown as the percent done value 416 to update and display, but is not so limited.

In one embodiment, an amount of processing time associated with the first control timing interval is divided evenly or in some manner among all active current asynchronous and/or synchronous tasks (see example of FIG. 5), called from first to last from an associated state block. Each command performs its work during the allotted time of the first control timing interval, periodically calling the pause function that informs it when it's time to save state in the state block and return control, until the beginning of the first control timing interval of the next command timing sequence. As an example, and as a result of implementation of the command timing sequence, the cancellable command API framework allows task processing operations to occur at a lower but yet responsive speed (e.g., half speed) while allowing the UI thread in the browser to update the progress indicator and/or respond to user input.

The output Test 2 telemetry information 420 shows that the task finished at 5000 ms, was not cancelled (value equals −1), and had forty-six (46) (1.-46.) control time slices associated with the command timing sequence for the Test 2 task. As shown, and according to the command timing sequence for Test 2 task, 51 ms was allotted to the associated command as part of the first control timing interval. The first time slice (0.) lasted 501 ms according to a long running time to allow a Test 2 task to finish before using the command timing sequence. The last time slice (46.) show that twenty-four (24) second were used by the command before finishing the task.

The download information 422 shows that the download operations did not finish (value equals −1) and was not cancelled (value equals −1) at the depicted point in time. The download information 422 shows that five time slices have occurred and no time has been spent on the client since downloading data is an asynchronous operation. It will be appreciated the that initial time period and subsequent command timing sequence and/or interval spans can be adjusted according to a desired implementation and interface responsiveness.

As an example, refer to JAVASCRIPT code used as part of providing features of the exemplary browser application interface 400 as disclosed in the ASCII text file entitled "CCAPIJS.txt" filed via the USPTO EFS as referenced in "Reference to Computer Program Listing Appendix."

Figure 5:
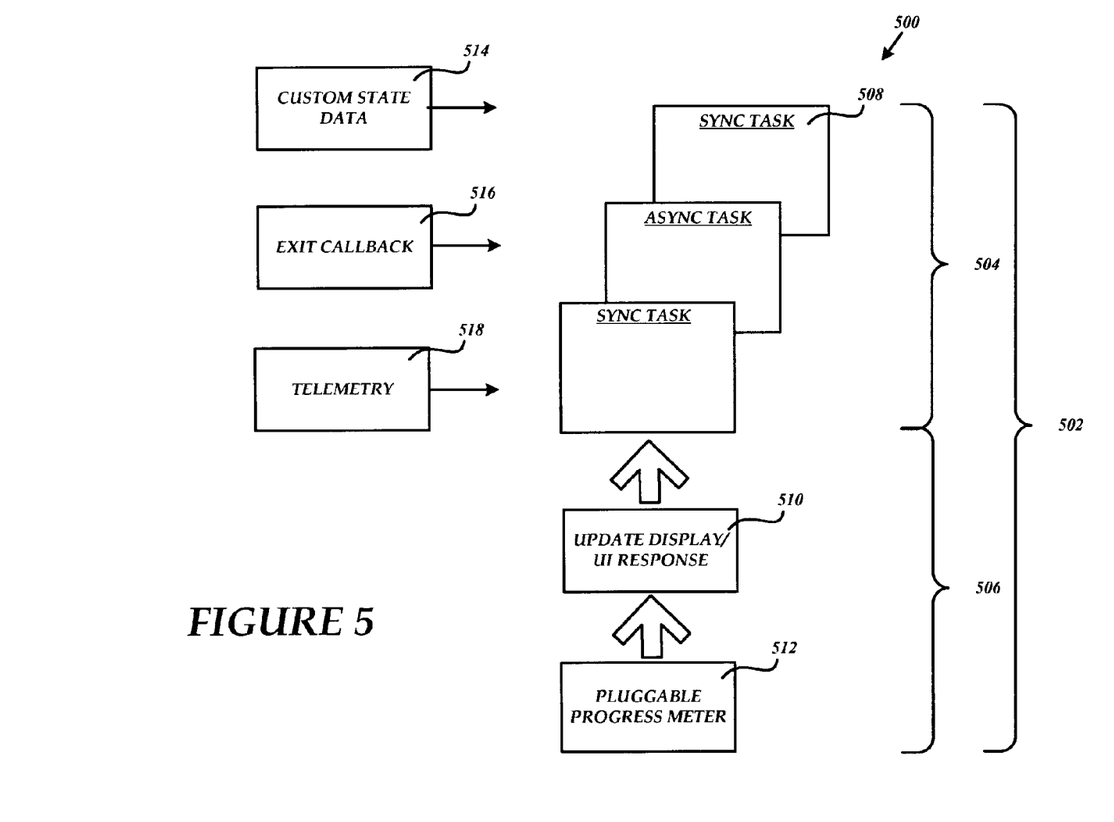
FIG. 5 is a functional block diagram that depicts an exemplary computing environment including features of a cancellable command API framework.

FIG. 5 is a functional block diagram that depicts an exemplary computing environment 500 including features of a cancellable command API framework. As shown in FIG. 5, a command timing sequence 502 includes a first timing interval 504 and a second timing interval 506. In one embodiment, the first timing interval 504 and second timing interval 506 are successively applied until a task completes or is cancelled, but is not so limited. As shown for this example, synchronous and asynchronous tasks 508 are being processed during the first timing interval 504 (e.g., for the first 50 ms of each command timing sequence).

During the second timing interval 506 of each command timing sequence, updates to the display as well as UI response 510 are allowed, as well as a pluggable progress meter update 512. It will be appreciated that a task may require multiple successive command timing sequences to process fully and is partly dependent on the processor thread allocation and hardware/software limitations. The cancellable command API framework uses custom state data 514, exit call back or finish information 516, and/or telemetry 518 as part of controlling implemented cancellable commands.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, back-end networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 6:
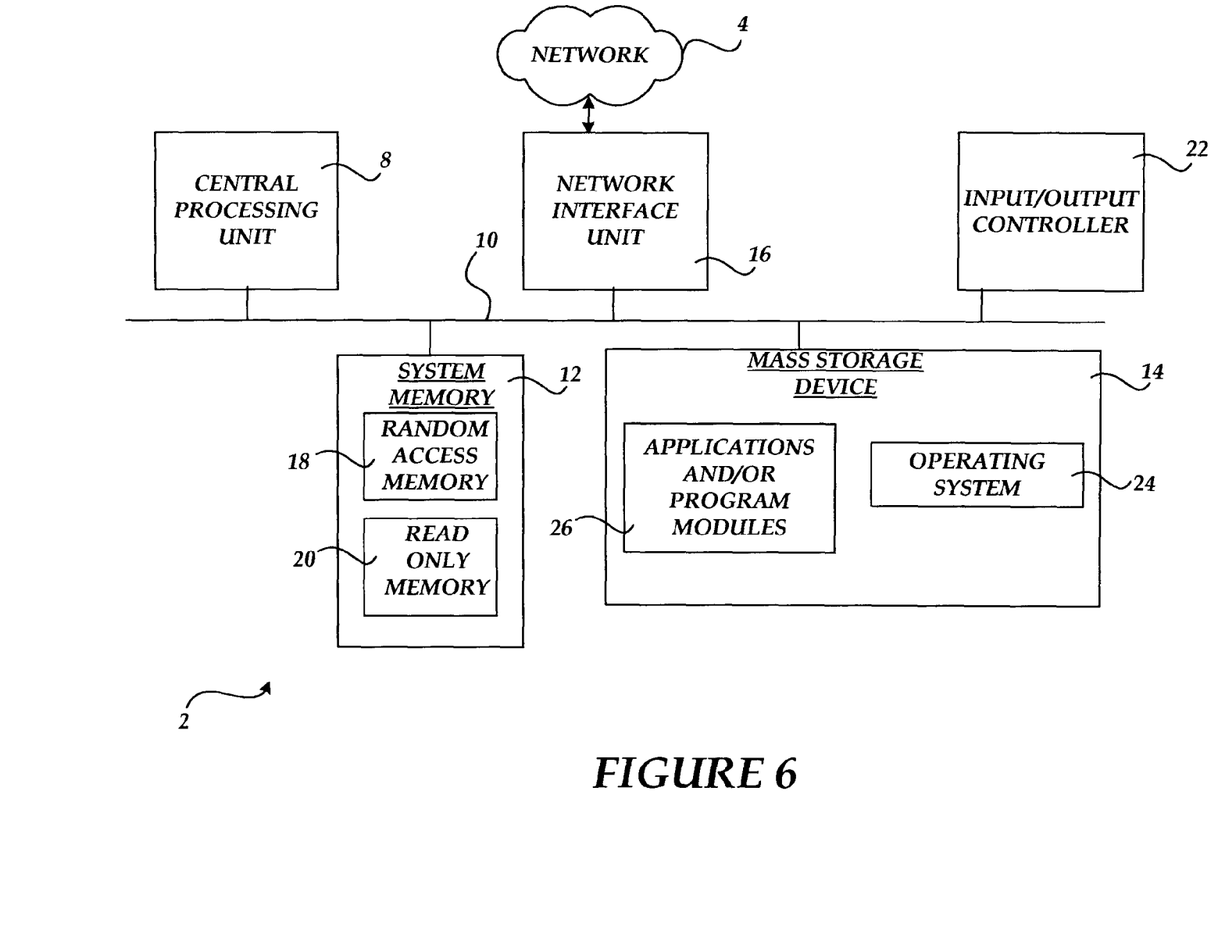
FIG. 6 is a block diagram illustrating an exemplary computing environment for implementation of various embodiments described herein.

Referring now to FIG. 6, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that embodiments of the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 6, an exemplary illustrative operating environment for embodiments of the invention will be described. As shown in FIG. 6, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
   creating a task associated with a cancellable command application programming interface (API) framework;
   defining a command block for a cancellable command that is used as part of executing the task, the command block including a state block to contain state data used in part to pause and restart task operations and a command function that uses the state block and a call to a pause function in an inner loop to determine when to save state to the state block and return control, and a finish function;
   using a cancellable command timer to control execution and processing of each task defined in part by a command timing sequence that includes a first timing interval allowing for command execution and a second timing interval for pausing the cancellable command to allow for other processing operations; and
   generating telemetry data associated with task processing operations including cancellation and completion data for each cancellable command API task.

2. The method of claim 1, further comprising using a cancellable command API component to control execution of asynchronous and synchronous operations including transforming synchronous operations into asynchronous operations during the command timing sequence and allowing for updating a user interface (UI) associated with the task including responding to user input during the second timing interval.

3. The method of claim 2, further comprising using the cancellable command API component as part of controlling cancellable commands including cancelling a first cancellable command upon starting execution of a second cancellable command.

4. The method of claim 1, further comprising encoding a browser application using code associated with the cancellable command API framework including a number of callback functions.

5. The method of claim 1, further comprising updating a browser application interface during the second timing interval of the command timing sequence.

6. The method of claim 1, further comprising calling a long function when an operation or process equals or exceeds a defined long running operation time.

7. The method of claim 6, further comprising calling a progress function as part of updating and displaying a visual progress meter.

8. The method of claim 7, further comprising calling a cancel function upon cancelling an associated cancellable command API task.

9. The method of claim 8, further comprising calling the cancel function as part of one or more cancellation types including an explicit cancellation type, an implicit by command type, and an implicit by navigation type.

10. The method of claim 1, further comprising using the pause function to return a false value until an associated cancellable command API task is deemed long running based on a long running time.

11. The method of claim 1, further comprising dividing processing time of the first timing interval among all active current asynchronous and synchronous tasks including calling the tasks from first to last from an associated state block.

12. The method of claim 1, further comprising dividing processing time of the first timing interval among active current asynchronous and synchronous tasks.

13. A cancellable command API framework comprising:
   a command block including a command function and a state block to maintain state-related information;
   a task engine to monitor the command function including a return value associated with a task finished callback;
   a task control timer to control execution of asynchronous and synchronous tasks based in part on first and second control timing intervals associated with a command timing sequence, wherein the task control timer operates in part to determine when to quit processing a current cancellable command task and wait during the second control timing interval to give a browser client time to update; and
   a telemetry component configured to provide telemetry data associated with each cancellable command API task.

14. The cancellable command API framework of claim 13, further configured to provide the telemetry data including finish and cancellation data for each cancellable command.

15. The cancellable command API framework of claim 13, further configured to use a cancellable command API definition that uses the pause function as coded in an inner loop of the command function to provide a control timing feature.

16. A computer-readable storage medium including instructions that, when executed, operate to:
   receive control input as part of starting a cancellable command API task, the cancellable command API task defined in part by a command block and a state block used as part of executing the cancellable command API task, the command block including a command function that uses a call to a pause function in part to determine when to save state to the state block and return control, and a call to finish function;
   allow a defined interval of time for the cancellable command API task to finish before using a command timing sequence;
   implement a cancellable command timer after completion of the defined interval of time, the cancellable command timer used in part to control execution and processing of each cancellable command API task using the command timing sequence that includes a first timing interval to allow for command execution and a second timing interval to allow for pausing each cancellable command API task and to allow other operations during the second timing interval; and
   capture telemetry data associated with progress of each cancellable command API task.

17. The computer-readable storage medium of claim 16 including instructions that, when executed, operate further to use a cancellable command API definition that uses the pause function as coded in an inner loop of the command function to provide a control timing feature.

18. The computer-readable storage medium of claim 16 including instructions that, when executed, operate further to provide the telemetry including finish and cancellation data for each cancellable command.

19. The computer-readable storage medium of claim 16 including instructions that, when executed, operate further to use a cancellable command API framework including a cancellable command API definition as part of providing a responsive browser interface.

20. The computer-readable storage medium of claim 19 including instructions that, when executed, operate further to use a cancellable command API framework including using one or more callback functions including a long running function and a cancel function.

* * * * *